(12) United States Patent
Delaney

(10) Patent No.: US 10,463,211 B1
(45) Date of Patent: Nov. 5, 2019

(54) FIXING DEVICE

(71) Applicant: CASSELLIE LTD, West Yorkshire (GB)

(72) Inventor: Paul Delaney, West Yorkshire (GB)

(73) Assignee: CASSELLIE LTD, West Yorkshire (GB)

(*) Notice: Subject to any disclaimer, the term of this patent is extended or adjusted under 35 U.S.C. 154(b) by 0 days.

(21) Appl. No.: 16/513,928

(22) Filed: Jul. 17, 2019

Related U.S. Application Data

(63) Continuation of application No. PCT/GB2018/051980, filed on Jul. 11, 2018.

(30) Foreign Application Priority Data

Jul. 11, 2017 (GB) .................................. 1711142.8
Oct. 30, 2017 (GB) .................................. 1717785.8
Feb. 1, 2018 (GB) .................................. 1801653.5

(51) Int. Cl.
*A47K 13/26* (2006.01)
*F16B 13/08* (2006.01)
*F16B 2/18* (2006.01)
*F16B 1/00* (2006.01)

(52) U.S. Cl.
CPC ............ *A47K 13/26* (2013.01); *F16B 1/0057* (2013.01); *F16B 2/185* (2013.01); *F16B 13/0841* (2013.01)

(58) Field of Classification Search
CPC ........................................................ A47K 13/26
USPC ............................................................. 4/237
See application file for complete search history.

(56) References Cited

FOREIGN PATENT DOCUMENTS

| DE | 29804519 U1 | 6/1998 |
| DE | 202015103074 U1 | 7/2015 |
| EP | 0480534 A1 | 4/1992 |
| GB | 774002 A | 5/1957 |
| GB | 2511132 A | 8/2014 |
| WO | 2016001371 A1 | 1/2016 |

OTHER PUBLICATIONS

International Search Report and Written Opinion dated Oct. 17, 2018 issued in PCT/GB2018/051980.

*Primary Examiner* — Lori L Baker
(74) *Attorney, Agent, or Firm* — Renner, Otto, Boisselle & Sklar, LLP

(57) ABSTRACT

A retaining pin comprising a body section having an aperture therein and being provided with a suction cup. An actuation mechanism arranged at a first end of the body section and a pin is connected at a first end to the actuation means and extends therefrom, through the aperture of the body section. An outer sleeve is arranged around the pin and in contact therewith and the outer sleeve comprises an expandable section that, upon operation of the actuation means, can be expanded from a first dimension to a second dimension.

15 Claims, 13 Drawing Sheets

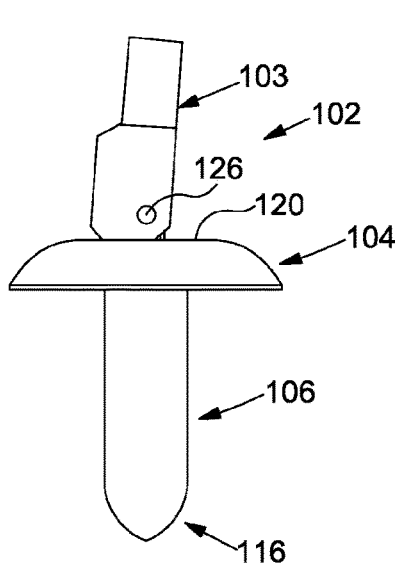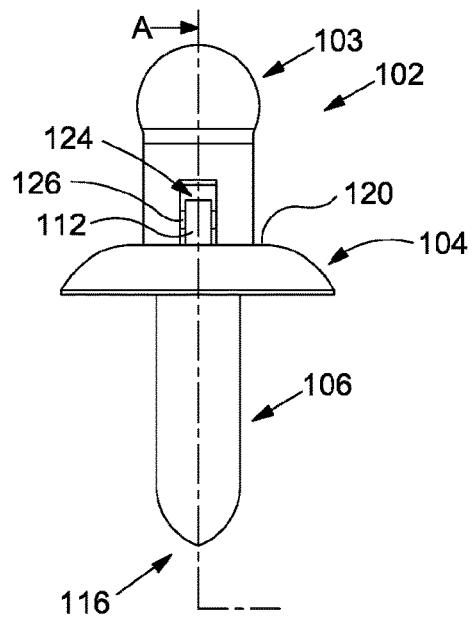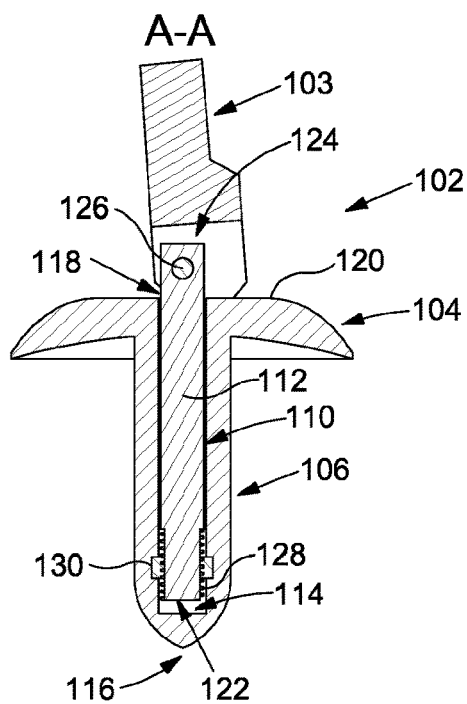

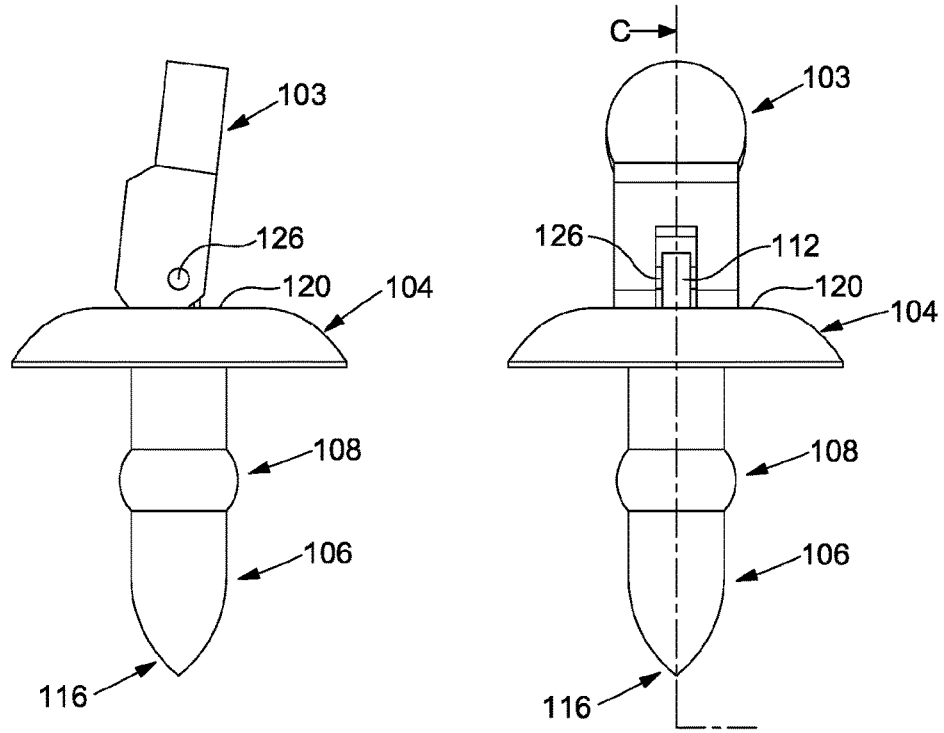
Fig 6a
Fig 6b
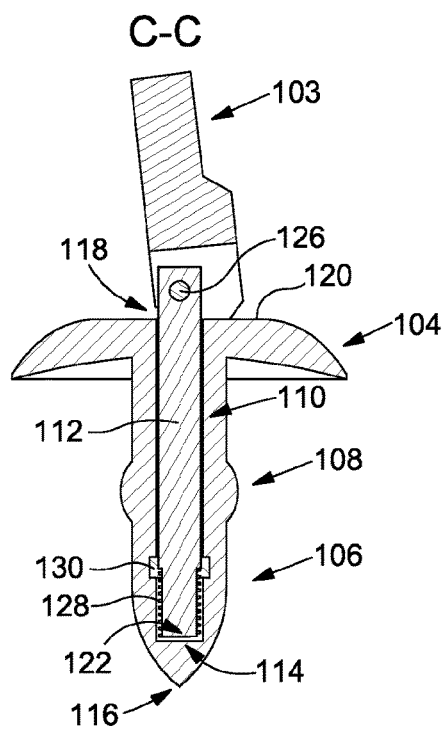
Fig 6c

FIXING DEVICE

RELATED APPLICATIONS

This application is a continuation of Application No. PCT/GB2018/051980 filed on Jul. 11, 2018, that claims the benefit of: Application No. GB 1711142.8 filed on Jul. 11, 2017; Application No. GB 1717785.8 filed on Oct. 30, 2017; and Application No. GB 1801653.5 filed on Feb. 1, 2018. Which are all herein incorporated by reference in their entirety.

TECHNICAL FIELD

This invention relates to a retaining pin having suction apparatus, particularly for use with holding two items together and being especially useful in holding a toilet seat on a toilet pan.

SUMMARY

Conventionally, a toilet seat and/or lid is attached to a toilet pan or bowl via bolts that are located through apertures in the toilet seat and through pre-defined apertures in the toilet pan. The bolts are inserted from an upper surface of the toilet pan and are secured in place using nuts connected from underneath the toilet pan; however, it is often difficult to gain access to the underside of the toilet pan because there is normally restricted access around and underneath the toilet pan. Additionally, the fitting process can require special tools to fit the nuts onto the bolts and so, once fitted, the toilet seat generally remains in place for the duration of use of the toilet pan or is at least seldom replaced. This creates a potential hygiene issue because the nut and bolt arrangement can be difficult to keep clean and disconnecting and refitting the seat can be a time-consuming process. Furthermore, it has been found that conventional fittings can become loose over time and have to be frequently tightened, otherwise the toilet seat can wobble, thereby becoming unsafe for the user.

Whilst previous toilet seat fixings have employed a suction cup to hold the toilet seat to a toilet pan, one problem that can arise is that the suction cups can undergo a degree of rotation or twist on opening and closing of the toilet seat and the fitting can become loose over time. This is undesirable and it requires the position of the toilet seat and/or lid with respect to the toilet pan to be periodically adjusted and/or tightened. Additionally, the holes in the toilet pan in which the bolts of the toilet seat are received may vary in both depth and diameter due to manufacturing tolerances. This can create an imbalance of forces on the toilet seat that can cause damage or deformation thereof.

According to a first aspect of the present invention there is provided a retaining pin comprising:
  a body section having an aperture therein and being provided with a suction cup;
  an actuation mechanism arranged at a first end of the body section;
  a pin, connected at a first end to the actuation means and extending therefrom, through the aperture of the body section; and
  an outer sleeve arranged around the pin in contact therewith;
  wherein the outer sleeve comprises an expandable section that, upon operation of the actuation means, can be expanded from a first dimension to a second dimension.

The present invention allows for the existing holes in a toilet pan biscuit to be employed for attaching a toilet seat to the pan, with the additional advantage of providing a suction force to more securely retain the seat on the pan. This provides a more secure fitting than using either suction or bolts alone.

In one arrangement, the outer sleeve is arranged substantially coaxially with the pin and the body section. This allows the parts to be readily aligned and to operate along substantially the same axis. As the actuation mechanism is arranged at one end of the pin and the sleeve is connected to the same pin, operation of the actuation mechanism to adjust the axial position of the pin, relative to the body section, changes the axial position of at least part of the sleeve in the same direction. The axial movement of the pin adjusts compression forces on the expandable section of the sleeve, thereby allowing the expandable portion to move between the relatively expanded condition and the relatively retracted condition. The actuation of the actuation means may simultaneously expand the expandable section of the sleeve and provide a force on the suction cup such that it engages a surface. This may be undertaken by providing an axial force on the pin to 'pull' the retaining pin towards the surface, thereby pressing the suction cup against the surface so that it fixes thereto.

It is particularly advantageous that the second dimension of the outer sleeve is greater than the first. This locks the retaining pin in place relative to an aperture through which the pin passes.

It is preferable that the body section comprises a threaded section on its external surface. The body section can engage the item to which it is being connected and/or the sleeve, depending upon the arrangement and the parts to be connected. The threads allow the position of the body section within the item to be adjusted within an aperture and/or for the position of the sleeve to be adjusted, relative to the body section and actuation mechanism.

Advantageously, the pin comprises an external threaded section along at least part of its length and the outer sleeve comprises a corresponding thread to engage the threaded section on the pin. Retaining the sleeve on the end of the pin allows the actuation mechanism to compress the expandable section of the sleeve, when operated.

In one embodiment, the outer sleeve comprises a plurality of sections. The use of a plurality of sections allows for adjustment of parts of the device that can be undertaken independently of other parts of the sleeve, and preferably, the sleeve comprises:
  a first section that engages the body section;
  second section comprising an expandable material; and
  a third section that engages the pin;
wherein actuation of the actuation mechanism moves the third section axially towards the body section to compress the second section, thereby causing it to expand radially and, more preferably, the position of the first section on the body section is axially adjustable to vary the distance between the first section and the actuating mechanism.

Where the sleeve comprises sections, it is advantageous that the position of the third section is axially adjustable on the pin to vary the distance between the third section and the actuation mechanism.

The first section can be moved axially along the body section to adjust the distance between the actuation mechanism and the second section. This allows the pin to be used for fitting items to surfaces with different depths, for example, toilet pan biscuits with depths that might vary significantly. The third section can be moved axially along the pin to adjust the amount of compression applied to the expandable material, thereby adjusting the width of the compressed section, which allows the device to compensate for various diameters through which it may pass, again, for example, in toilet pans where the aperture diameter may vary from 14 mm to 18 mm. The first and third sections may be considered to be limiting mechanisms that are located on both sides of the expandable section. This limiting means then ensures correct expansion and retraction of the expandable section. Preferably, first and third sections of the sleeve may comprise one or more of: nuts; sleeve members; ferrules washer members; and inserts.

In an alternative arrangement, the outer sleeve is integral with the body section. This provides a device that is simple to manufacture and operate and is particularly useful where the depth of an aperture into which the device is intended to be inserted does not vary, thereby allowing the expandable section to be positioned at a set distance from the actuation mechanism.

In one arrangement, the suction cup is integral with the body section. Alternatively, the suction cup is connected to the body section. Whilst the suction cup may be a distinctly different element that can be connected to the body section, or to which the body section may connect, a single, integral body section and suction cup reduces the risk of air ingress. Where the body section and the suction cup are different elements, it may be desirable for the body section and the suction cup to each have a part of a two-part threaded connection, thereby allowing the parts to be threadedly connected to one another. This allows for the parts to be retained in place whilst also allowing axial displacement of the two parts relative to one another.

It may be that the expandable section comprises an elastomeric material or a rubber material that expands radially when compressed. Other materials may also be suitable for compression in such a manner that they materials provide a predictable radial expansion upon axial compression. For example, expandable, flexible and/or resiliently deformable material, such as rubber, neoprene, latex, silicone and/or plastics material.

It is preferred that the actuation mechanism comprises a cam to move the end of the pin distal from the actuation mechanism axially within the body section, thereby compressing the expandable material. The use of a cam provides a simple mechanism for actuating the device, whilst being easy for a user to operate.

In the present invention, the retaining pin may be biased into having the expandable section in an expanded or contracted position. Thus, in one arrangement, the user may operate the actuation mechanism to narrow the sleeve thereby allowing the pin to be inserted, before the biasing expands the sleeve. Alternatively, user actuation may expand the sleeve from the contracted position so that the pin is inserted in its rest state and then expands when in place. Where the pin is biased to the contracted state, the actuation mechanism may require a locking element to keep the actuation means activated and the sleeve in the expanded state, which may be in the form of a cam.

The present invention extends to a toilet seat arrangement comprising a toilet seat having a body portion and a retaining pin as set out herein, the retaining pin being connected to the toilet seat. Thus, the present invention may relate to a toilet seat that is provided with a retaining pin for attaching the toilet seat to a toilet pan.

Preferably, an aperture in the body portion of the toilet seat comprises a threaded inner surface and the body section of the retaining pin comprises corresponding threaded section and the respective threaded sections engage. This allows adjustment of the position of the retaining pin, relative to the body portion of the toilet seat.

The present invention further extends to a toilet seat and toilet pan fixing arrangement and a method of installing the same, wherein a toilet seat as set out herein is provided and a toilet pan is provided that has a biscuit with at least one aperture therein, wherein the retaining pin passes through the at least one aperture in the toilet pan biscuit and, when the actuation mechanism is operated, the expandable section expands to a size larger than the aperture in the toilet pan biscuit, thereby retaining the seat on the pan.

Thus, the present invention may include a first engagement means in the form of suction or vacuum means, particularly a suction cup. The suction or vacuum means may be arranged such that it is able to be put into a first condition, wherein a vacuum or a partial vacuum, is formed between the vacuum/suction means and a surface onto which the retaining pin is to be affixed. A second disengaged condition may be possible, wherein a vacuum, or partial vacuum cannot be formed, for example, by allowing air ingress so that the device can be disengaged from the surface. A second engagement means is provided in the form of an expandable portion. The expandable/inflatable portion is arranged to be moved between an expanded and engageable position when the suction cup is in or moved to the first engaged condition, and a deflated and/or reduced size and disengageable position when the suction cup is in or moved to the second disengaged condition.

Thus, the suction cup of the present invention provides a secondary engagement means beyond the expandable section to allow engagement to two or more items or surfaces. The two engagement means ensure a stronger and more secure engagement between the retaining pin and the item to which it is attached.

In one embodiment the suction cup can be used to engage a toilet seat lid to a surface of a toilet pan, and the second engagement means, in the form of the pin and expandable sleeve, can be used as a locator to locate and engage the suction apparatus on an aperture or conventional bolt aperture defined in the toilet pan. An advantage of this arrangement is that the toilet seat/lid and the suction apparatus can be removed from the toilet as a single unit, thereby making it easier to clean and therefore more hygienic.

In one arrangement, the suction cup may be integrally formed with or directly joined to the expandable sleeve.

Preferably, the suction cup and the expandable sleeve both enter the engaged condition and disengaged condition simultaneously, or within quick succession to engage or disengage the item at the same time.

It is advantageous to connect a toilet seat to a surface of a toilet bowl or toilet pan that has apertures for connecting a toilet seat thereto.

It preferable that actuation of the actuation mechanism directly actuates movement of the expandable sleeve, which, also engages the suction cup onto a surface. In a different arrangement, actuation of the actuation means may induce the suction cup or expandable sleep to indirectly engage or disengage the item/surface.

It is envisaged that the suction cup and the expandable sleeve may be operated independently from one another.

A device may be provided for engaging an aperture in a surface, wherein a substance and/or item that is moveable into and out of a first chamber to a second chamber in the form of an expandable/inflatable portion in order to expand the device and retain it within the aperture.

The suction cup apparatus may include a head portion and/or a neck portion that might be integrally formed.

In the present invention, it is preferred that the suction cup is provided on a head portion, and preferably an underside or lower surface of the head portion. Where a head portion is employed, the expandable sleeve may be associated with a neck portion.

It may be that a cavity is defined through the head portion and/or the neck portion, preferably, along a longitudinal axis of the cavity, which is parallel to a longitudinal axis of the neck portion.

Preferably, the item to which the retaining pin is being connected includes one or more nuts, sleeve members or, insert members.

The sleeve may comprise one or more objects, nuts, sleeve members and/or insert members that are fixedly located within the sleeve. Movement of the pin in an upwardly sliding linear manner towards the body section causes the objects, nuts, sleeve members and/or inserts to move with the pin, thereby causing the sleeve to be placed under compression, which, in turn, causes radial expansion of the expandable portion.

Where one or more objects, nuts or insert members are provided within the sleeve, adjustment of the position of the one or more objects, nuts or insert members on the support member changes the degree or size of radial expansion of the expandable/inflatable portion when in the expanded condition. This allows the retaining pin of the present invention to be adjusted so that the expandable sleeve can fit different sized apertures and/or to adjust the force with which the suction cup is pressed against the surface to which it is connecting. Thus, in this example, the width of the expandable section expands can be adjusted or changed to allow the present invention to be used with different width apertures in the toilet pan or toilet bowl.

Where the sleeve comprises sections, one or more sections may be provided adjacent the expandable section to allow adjustable movement of the expandable portion. For example, the one or more inserts can control the level of radial and axial expansion of the expandable section.

It is desirable that the expandable section of the sleeve is capable of axial along the pin. This allows the position and/or length of the sleeve to be changed or adjusted, thereby allowing the retaining pin to be used with different depth apertures, such as those in a toilet pan, toilet bowl or item. The parts of the sleeve may be rotatably mounted on the pin and/or body section to allow relative movement or adjustment between the same.

Preferably, the suction cup has an internal screw thread to allow engagement with the body section and the pin passes through the suction cup and body section and into the sleeve.

It is preferred that the suction cup is provided on an upper surface of a toilet pan when the present invention is employed to connect a toilet seat to a toilet pan.

The degree of attachment/adhesion of the suction cup to the surface should be sufficient that the retaining pin does not become disconnected during regular use of the item to which it is connected. Thus, where the retaining pin is employed in connecting a toilet seat to a toilet pan, a user should be able to use the toilet without the risk of inadvertent detachment of the seat. Therefore, the retaining pin must be actively detached to remove it from the item.

The actuation mechanism may comprise one or more of a group comprising: levers; buttons; pumps; pump handles; pivot handles; piston handles; and pump actuation bladders.

In one embodiment the actuation mechanism is a connected to or forms part of the toilet seat and/or toilet lid with which the retaining pin is associated. Movement of the toilet seat and/or lid typically allows movement of the suction cup and expandable section.

Locking means may be associated with the actuation mechanism, toilet seat and/or toilet lid such that once the toilet seat and/or lid has been used to actuate the retaining pin, thereby expanding the sleeve and fitting the suction cup, further movement of the toilet seat and/or lid does not alter the position of the suction cup.

Advantageously, the locking means are movable between an unlocked position, wherein the toilet seat and/or lid acts as the actuation means for the suction apparatus, and a locked position, wherein the toilet seat is prevented from acting to affect the suction cup or expandable section, so that and the toilet seat and/or lid can then be used in a conventional manner.

The locking means may be slidably, pivotably and/or rotatably movable between the locked and unlocked positions.

A biasing mechanism may be provided to bias the retaining pin in an unexpanded position so that the retaining pin needs to be actively engaged with the item by way of operating the actuation mechanism, in which case the actuation mechanism may comprise a locking mechanism to ensure that the retaining pin remains in the expanded position, for example, by way of a cam. Alternatively, the biasing may be in the expanded position so that the user needs to actively reduce the expandable section to install the retaining pin. Where biasing is present, it may comprise springs and/or resiliently yieldable material.

It is envisaged that it may be desirable to provide an actuation means with a pump for pumping air out of the suction cup to provide a strong seal or to aid with releasing the retaining pin. The pump may be connected to the suction cup by a conduit or pipe. The pump may be operated by the actuation mechanism or by the toilet seat.

The present invention provides a retaining pin with a suction cup that allows a toilet seat to be fitted or removed by a user entirely from an upper surface of the toilet pan, thereby reducing the problems associated with the prior art in relation to gaining access to the underside surface of the toilet pan for securing/releasing attachment of the toilet seat. The process of fitting and/or removing the toilet seat with respect to the toilet pan is significantly simplified and no special tools or user skill is required, in addition to reducing the fitting/removing time. There are no, or at least a reduced number, of exposed non-planar attachment parts to be kept clean, thereby making the resulting toilet arrangement easier to clean.

BRIEF DESCRIPTION OF THE DRAWINGS

Embodiments of the present invention will now be described with reference to the following figures, wherein:

FIGS. 4a-4c show a side view, a front view, and a cross sectional view taken along line A-A of FIG. 4b, of suction apparatus with user actuation means in a disengaged condition respectively according to an embodiment of the present invention;

FIGS. 6a-6c show a side view, a front view, and a cross sectional view taken along line C-C of FIG. 6b of the suction apparatus in FIGS. 4a-4c following adjustment of the expandable portion according to an embodiment of the present invention;

FIG. 15a shows a front view of the engagement apparatus in a start and disengaged position on a toilet bowl;

FIG. 15b shows a cross sectional view taken along line B-B of FIG. 15a;

FIG. 15c shows a cross sectional view taken along line A-A of FIG. 15a; and

FIG. 15d is a partial perspective view of FIG. 15a;

FIG. 16d is an enlarged view of the circular section in FIG. 16a;

DETAILED DESCRIPTION OF THE FIGURES

Figure 1A:
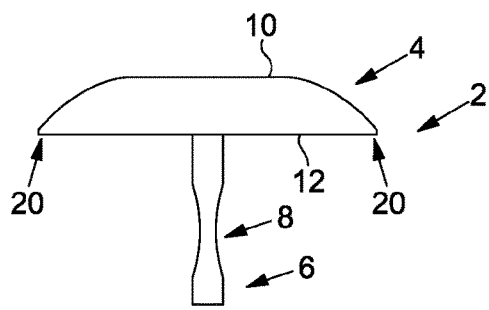
FIGS. 1a-1c show a side view, a top plan view, and a cross sectional view taken along line A-A in FIG. 1b of suction apparatus when in a disengaged position.
Figure 1B:
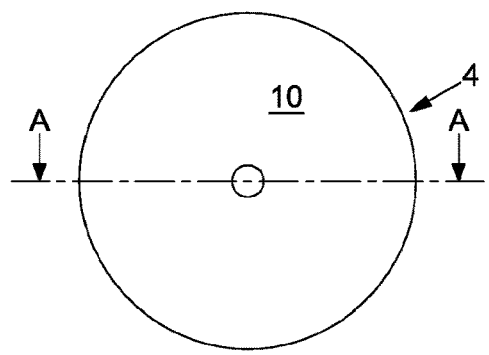

Referring firstly to FIGS. 1a-2c, there is illustrated a retaining pin 2 according to a first embodiment having two separate and distinct engagement means: the first engagement means comprising including a head portion 4 in the form of a suction cup which allows engagement of the apparatus 2 to a surface or item in use via suction/vacuum formation, and second engagement means including a neck portion 6 having an inflatable/expandable portion 8 which allows engagement of the apparatus 2 to a surface or item via friction fit.

In the illustrated embodiment movement of the head portion 4 between an engaged position and a disengaged position, actuates movement of the inflatable/expandable portion 8 between expanded and deflated conditions as will be described in more detail below.

The head portion 4 includes an upper surface 10, and a lower surface 12. A cavity 14 is defined within the head portion 4 which contains a flowable substance in the form of air. The lower surface 12 is concave in shape, at least when the head portion is in a disengaged condition.

The neck portion 6 is elongate in form and protrudes outwardly and axially from lower surface 12 of head portion 4. The inflatable/expandable portion 8 is defined in the neck portion 6 a spaced distance 'd' from, and below, the head portion 4. A channel 18 is also defined in said neck portion 6 between said cavity 14 and said inflatable/expandable portion 8 and allow fluid communication between the cavity 14 and to inflatable/expandable portion 8. Thus, air contained within cavity 14 is able to be moved along channel 18 and into the inflatable/expandable portion 8. It is also noted that the cavity 14, channel 18 and inflatable/expandable portion 8 are hermetically sealed from the surrounding air so that air contained within the same cannot leak out.

A longitudinal axis of channel 18 is parallel to a longitudinal axis of neck portion 6. The longitudinal axis of neck portion 6 is provided substantially orthogonally the head portion 4 to form a T-shape.

The head portion 4 is flexible and is arranged such that it can be moved between a first engaged condition, wherein a vacuum, or at least a partial vacuum, is or can be formed between the lower surface 12 of the head portion 4 and a surface on which the head portion is placed, to engage the lower surface 12 to the surface, and a second disengaged condition, wherein a vacuum, or partial vacuum cannot be formed and lower surface 12 of head portion 4 and the surface on which the head portion 4 is to be placed or removed from is open to atmosphere and the lower surface 12 is disengaged from the surface. With the head portion 4 in the engaged condition, the air pressure acting on the outer or top surface 10 of head portion 4 is significantly greater than the air pressure defined between lower surface 12 and the surface on which the head portion 4 is to be engaged.

In order to move the head portion from the disengaged position to the engaged position, a user is required to apply a downward pressure on top surface 10 of head portion 4 in the direction of neck portion 6. This application of pressure forces the air contained between the lower surface 12 and the surface on which the head portion is to be engaged to in use outwardly of the outer edges 20, thereby creating at least a partial vacuum under the lower surface 12 to engage the lower surface 12, or at least the lower surface adjacent the outer edges 20 to the surface.

In order to move the head portion from the engaged position to the disengaged position, a user is required to break the vacuum under the lower surface 12 by lifting the outer edges 20 sufficient to allow air to enter the underside of surface 12 or to use an actuation mechanism to release the vacuum.

The above described operation of the suction cup head portion 4 is conventional. However, in accordance with the present invention, movement of the head portion 4 between the engaged and disengaged positions, causes the air contained within the cavity 14 of the head portion and in channel 18 and inflatable/expandable portion 8 of the neck portion 6 to also move, thereby moving the inflatable/expandable portion 8 between an expanded position, as shown in FIG. 2c, to a reduced size position, as shown in FIG. 1c.

Figure 1C:
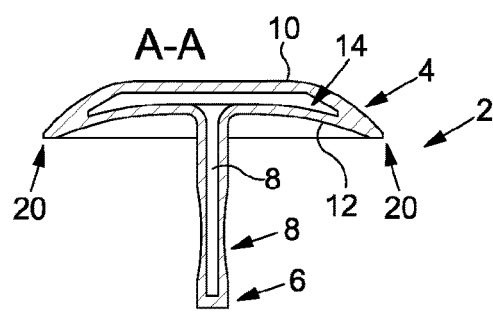
Figure 2A:
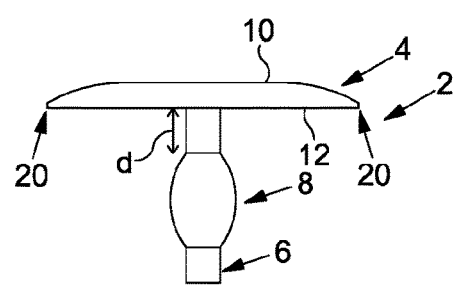
FIGS. 2a-2c show a side view, a top plan view, and a cross sectional view taken along line B-B in FIG. 2b of the suction apparatus of FIGS. 1a-1c when in an engaged position.
Figure 2B:
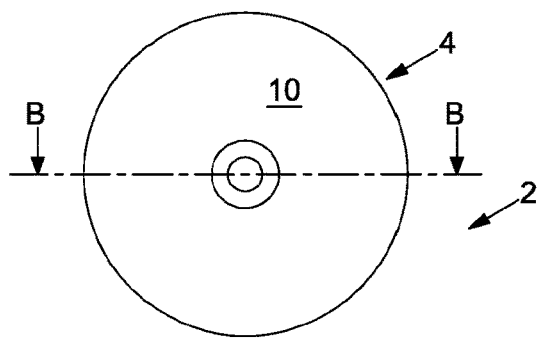
Figure 2C:
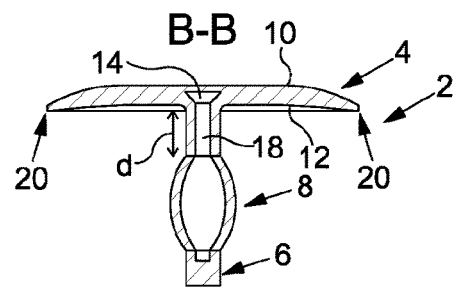

Thus, in FIG. 1c, air is contained in cavity 14, channel 18 and in inflatable/expandable portion 8 and is in relative equilibrium or equal pressure throughout. This represents the head portion 4 being in the disengaged position and the inflatable/expandable portion 8 being relatively small in size and therefore also in a disengaged position. In FIG. 2c, as the head portion is moved to an engaged position, air contained in cavity 14 is forced through channel 18 and into the inflatable/expandable portion 8, thereby allowing expansion of the inflatable/expandable portion 8 and causing an increase in its size and a change in shape. This increase in size and change in shape of portion 8 can be used to prevent removal of the upper part of the neck portion, shown by distance 'd' from an aperture the neck portion has been located through in use, thereby providing an engaged position. The suction force provided in retaining the head portion 4 engaged to a surface in use is typically larger than the force created by the air pressure of inflatable/expandable portion 8 acting on the opening to cavity 14, thereby preventing air from moving back into cavity 14 from portion 8 until the suction force of the head portion has been released/disengaged.

Figure 3A:
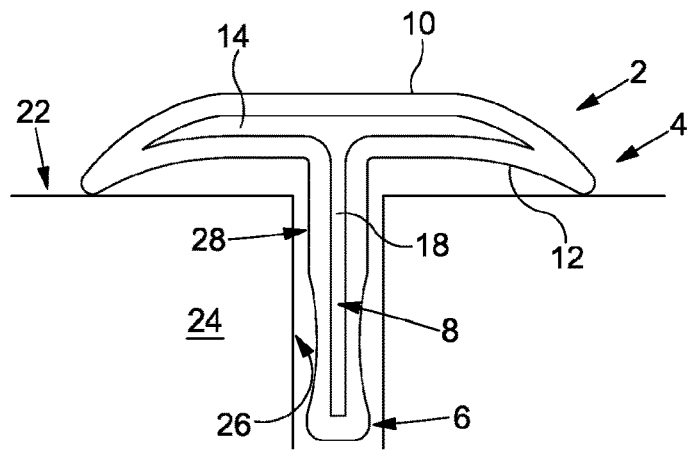
FIGS. 3a-3b show a cross sectional view of the suction apparatus in FIGS. 1a-2c when used for fitting a toilet seat/lid to a toilet pan in a disengaged position and an engaged position respectively.
Figure 3B:
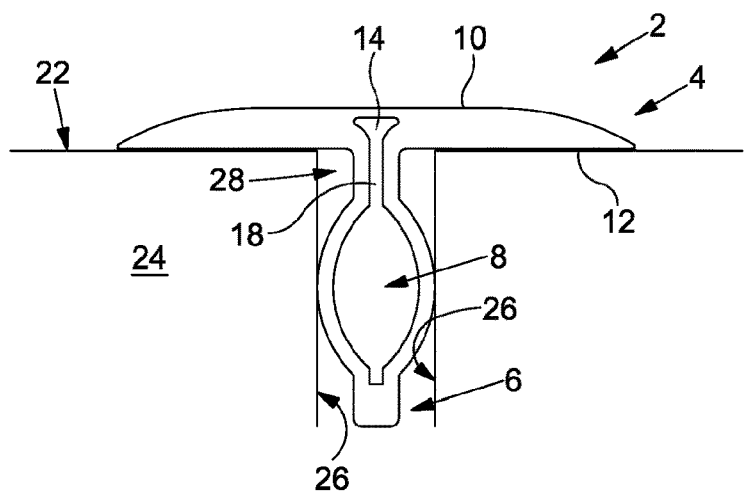

FIGS. 3a-3b show the suction apparatus 2 in a disengaged position and an engaged position, respectively, with respect to a toilet pan 24. In particular, head portion 4 is engaged to an upper surface 22 of a toilet pan 24 when in an engaged position as a result of the air pressure acting on surface 10 being greater than the air pressure or vacuum contained between the underside surface 12 of head portion 4 and the upper surface 22. The inflatable/expandable portion 8 of neck portion 6 engages with the inner surfaces 26 defining aperture 28 when in an expanded condition as a result of friction fit when in an engaged position, thereby preventing removal of the neck portion 6 from aperture 28 in use. Deflation of portion 8 reduces the diameter of neck portion 6 at portion 8, thereby allowing the neck portion to be inserted into and/or removed from aperture 28.

FIGS. 4a-6c show a second embodiment of the present invention wherein a retaining pin 102 is provided with user actuation means in the form of a lever 103 to actuate or allow movement of the other parts of the pin. This retaining pin is suitable for use in apertures with a substantially standard depth but that might vary in diameter as the axial expansion of the pin may be varied.

The retaining pin 102 comprises a body section and suction cup 104 with a sleeve 106 extending therefrom and having an expandable portion 108 defined part-way along the length of the sleeve 106. An elongate cavity 110 is defined within sleeve 106 and through the body section and suction cup 104 for the location of a pin 112. A first end 114 of cavity 110 is a closed end and is provided adjacent first end 116 of sleeve 106 furthest from the suction cup 104. A second end 118 of cavity 110 has an opening on a top surface 120 of body section and suction cup 104.

A first end 122 of the pin 112 is located adjacent first end 114 of cavity 110 and a second end 124 of the pin 112 protrudes outwardly of the second end 118 of cavity 110. Lever 103 is pivotably mounted to second end 124 of the pin 112 via a pivot pin 126. The pivot pin 126 is perpendicular to the longitudinal axis of the sleeve 106 and parallel to the top surface 120 of the body section and suction cup 104.

Figure 5A:
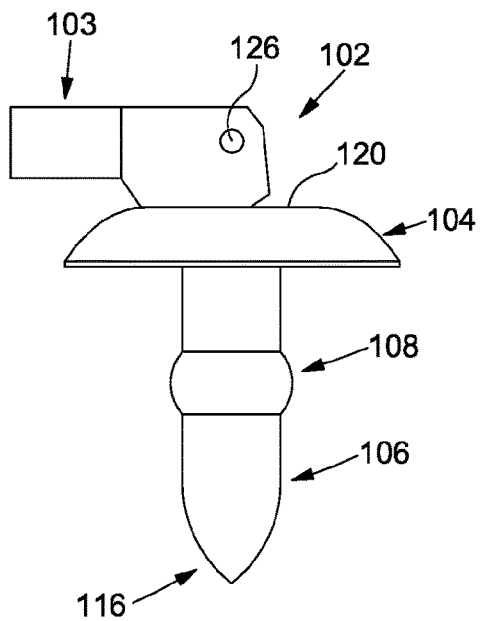
FIGS. 5a-5c show a side view, a front view, and a cross sectional view taken along line B-B of FIG. 5b of the suction apparatus in FIGS. 4a-4c in an engaged condition respectively.
Figure 5B:
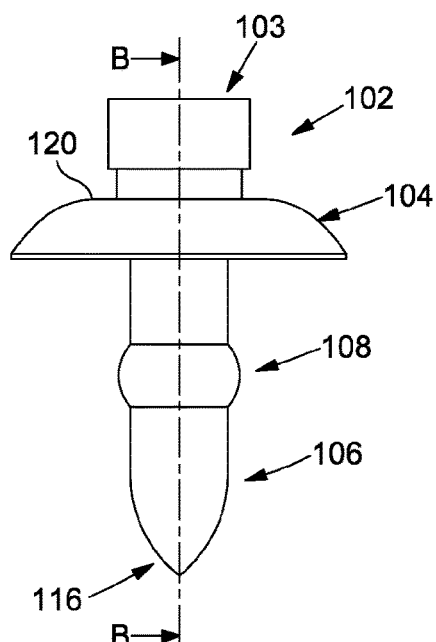
Figure 5C:
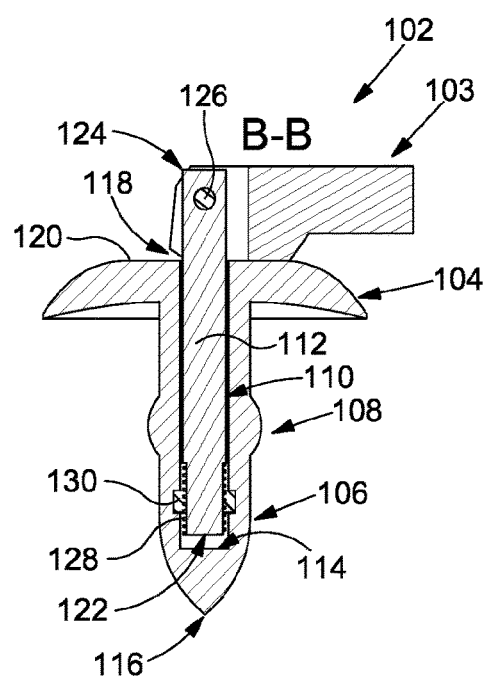

Lever 103 is pivotably movable by a user relative to the pin 112 from the first disengaged position, shown in FIGS. 4a-4c, wherein the lever 103 is in a relatively upright position and a longitudinal axis of the lever is parallel or substantially parallel to the longitudinal axis of the sleeve 106, to the second disengaged position, shown in FIGS. 5a-5c, wherein the lever 103 has been moved through approximately 90 degrees to a relatively lowered position and a longitudinal axis of the lever is perpendicular or substantially perpendicular to the longitudinal axis of the sleeve 106.

Movement of the lever 103 from the first disengaged position to the second engaged position firstly raises pin 112 relative to the body section 104, thereby compressing the expandable section 108 and forcing it to expand radially outwards to increase its diameter. As the expandable section contacts the adjacent surface, this creates a force that moves the suction cup 104 towards the expandable section 108, pressing it against the surface that it contacts and forcing air from within the flexible suction cup 104, creating a partial vacuum to provide a secondary retaining force to keep the retaining pin in place.

At least a portion of the pin 112 adjacent first end 122 is provided with a screw thread 128 on an external surface thereof. This allows rotatable engagement with an object in the form of a nut 130 having a screw thread on an inner surface of the same, as will be described in more detail below. The nut 130 is fixedly engaged in cavity 110 to the inner wall of sleeve 106.

As the lever 103 moves the pin 112 from the relatively lowered position to the relatively raised position within the sleeve 106, the nut 130 also moves with the pin 112 within the sleeve 106 towards the body section and suction cup 104, thereby causing compression of the sleeve between the nut 130 and the body section 104, thereby causing expansion of expandable portion 108 of the sleeve 106, as shown in FIGS. 5a-5c.

The material from which the neck portion and/or the expandable portion is formed typically allows a greater degree of expansion of the material in this expandable region on movement of the nut towards the same compared to movement of the nut towards the first end 116 of the sleeve 106.

In addition to the lever 103 being pivotably movable relative to body section and suction cup 104 and the pin 112 to allow movement of the pin 112 between the engageable and disengageable positions, lever 103 is rotatable relative to the body section 104 and nut 130 to allow movement of the nut 130 along the length of the pin 112. This allows adjustment of the apparatus 102 so that the second engagement means can engage with different sized apertures in use. It is to be noted that the lever 103 can be arranged to rotate relative to the sleeve 106, or at least part of the sleeve 106 can be arranged to rotate relative to the lever 103.

Movement of the nut 130 along the length of the pin 112 adjusts the level of compression that the sleeve 106 undergoes on actuation of the lever 103. More particularly, as nut 130 is moved towards the expandable portion 108 relative to the pin 112 during the rotation, this causes the expandable portion 108 to expand even when the lever 103 is in the disengaged position. When the lever 103 moves to the engaged position, this causes even greater expansion of the expandable portion 108, thereby allowing the expandable portion 108 to engage with a larger diameter aperture than previously. The reverse process can happen to allow the apparatus to fit into a smaller diameter aperture.

Figure 7A:
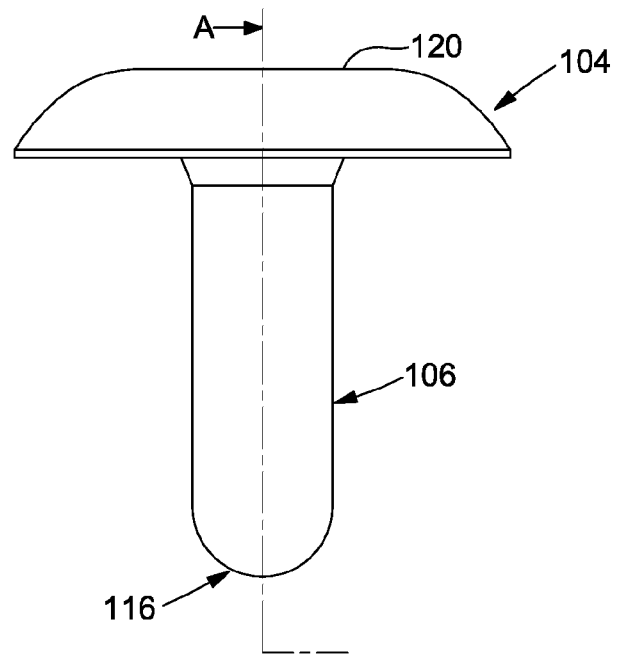
FIGS. 7a-7b show a side view, and cross-sectional view taken along line A-A in FIG. 7a, of the head and neck portion only of the apparatus shown in FIGS. 4a-4c.
Figure 7B:
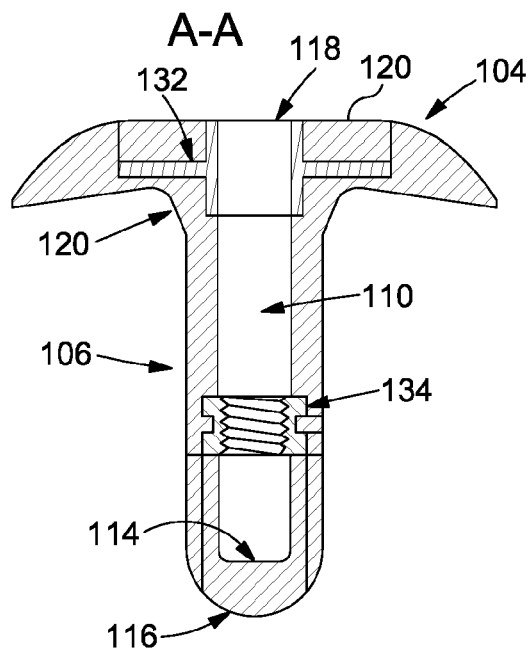

FIGS. 7a-7b show detailed illustrations of the body section and suction cup 104 and sleeve 106 of the embodiment in FIGS. 4a-6c with the lever 103, pin 112 and nut 130 removed. Inserts 132, 134, which are formed from rigid metal in this example but could be formed from any suitable material, are located adjacent and surrounding the opening 118 of the cavity 110 and part way down the cavity 110 between the first end 114 and the second end 118. These inserts ensure correct expansion of the expandable portion 108 during use and prevent a "mushroom" type effect where movement of the nut 130 causes other areas of the neck portion and/or head portion to expand other than the expandable portion 108, which is undesirable. It is to be noted that insert 132 could protrude outwardly of second end 118 if required to provide additional support.

The portion 121 between the upper part of the sleeve 106 where it joins with the lower surface of the body section 104 is provided at an acute angle with respect to sleeve 106 or is chamfered relative to sleeve 106 to aid stability and location of the apparatus 102.

Referring to FIGS. 17a-19b, there is illustrated an embodiment of the present invention in which the length of the sleeve of the retaining pin 200 can be adjusted, thereby allowing the apparatus to fit securely in different depths or heights of aperture. The length of the sleeve is adjusted in a direction parallel to the longitudinal axis of the sleeve, that is to say, the sleeve is adjustable in its axial direction. Similar features described in previous embodiments will be referred to by the same reference numerals.

The retaining pin 200 comprises a tubular body section 210 that is provided with external threads about at least part of its surface. A suction cup 104 is provided that has an axially extending aperture with a collar 204 extending axially from the aperture on the convex side of the suction cup 104. The internal and external surfaces of the collar 204 are provided with respective threads and the suction cup 104 is mounted by its internal threads onto the external threads of the body section 210. Adjacent the end of the collar distal from the suction cup 104 is an actuation mechanism in the form of a lever 103. The lever 103 is connected to the first end of a pin 208 by way of a pivot pin 212 that passes through the lever 103 and through an eye 215 in a first end 214 of the pin 208. The pin 208 extends from its first end 214 through the suction cup 104 and through the body section 210 to a second end 216, with threads 220 being provided about at least part of the pin 108, particularly at the second end 216.

The pin member 208 is pivotably mounted on lever 103 via a pivot pin 212 which passes through an aperture 215 at a first end 214 of pin 208. The pin member 208 is of such length to pass through the channel of sleeve 204 and through the channel defined through sleeve member 210, such that a second end 216 of pin member 208 protrudes below and outwardly the second engagement means or expandable portion 108. A screw thread 218 is provided on the external surface of pin member 208, at least adjacent second end 216. Operation of the actuation mechanism 103 results in axial movement of the pin 208.

A sleeve 106 is arranged coaxially around pin 208 and connected thereto. The sleeve 106 comprises three sections: a first adjustable nut 131 that engages the external screw thread 220 of the body portion below the suction cup 104; an expandable portion 108 positioned adjacent the first adjustable nut 131; and a second adjustable nut 130 that threadedly engages the threads 218 of the second end 216 of the pin 208. Rotation of the first adjustable nut 131 moves the nut axially along the body section 210, which, in turn, allows the axial position of the expandable section 108 to be adjusted, relative to the body section 210, and so also relative to the actuation mechanism and the suction cup 104. The second adjustable nut 130 can be rotated on the pin to move it towards the first adjustable nut 131 or away therefrom. When the second adjustable nut 130 is moved closer to the first adjustable nut 131, the expandable portion 108 may be compressed. Conversely, movement of the second adjustable nut 130 away from the first adjustable nut 131 reduces or removes the compressive force upon the expandable section 208. As a result, the radial expansion of the expandable section 208 can be controlled to adjust its diameter when compressed. This allows the expandable section to be suitable for various diameter apertures and where the aperture in which the retaining pin is inserted is large, the second adjustable nut 130 can be moved closer to the first adjustable nut 131 to increase the radial expansion. Movement of the first adjustable nut 131 relative to the body section 210 adjusts the axial position of the expandable section relative to the actuation mechanism 103 and so the retaining pin can accommodate varying thicknesses of surface to which it is to be attached.

Figure 17A:
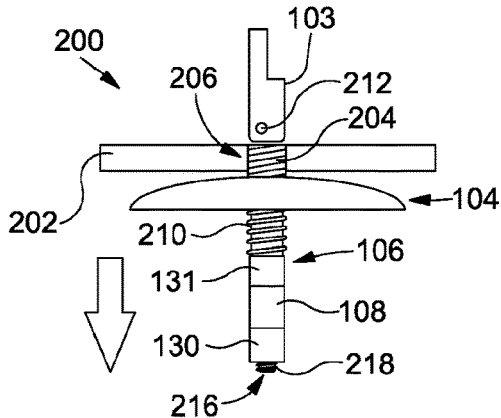
FIGS. 17a and 17b show suction apparatus according to an embodiment of the present invention in a disengaged position and an engaged position respectively, with the length of the support member provided in a longest adjusted position.
Figure 17B:
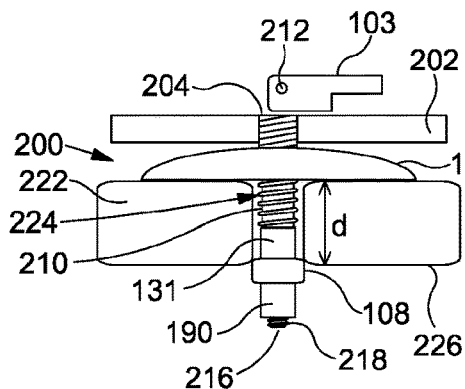

FIG. 17a shows the position of the sleeve 106 adjusted to its maximum length, with the body section 210, the adjustable nuts 130 and 131 and expandable portion 108 rotatably moved towards the second end 216 of the pin 208. This allows the suction apparatus to be used to engage to a toilet pan 222 having an aperture 224 with a relatively large depth 'd', as shown in FIG. 17b. FIG. 17a shows the retaining pin in a disengaged position with respect to the toilet pan 222 and FIG. 17b shows the retaining pin in an engaged position on the toilet pan 222.

Figure 18A:
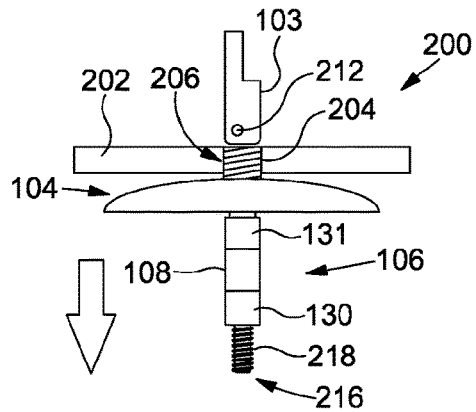
FIGS. 18a and 18b show the suction apparatus in FIGS. 17a and 17b respectively in a shortest adjusted position.
Figure 18B:
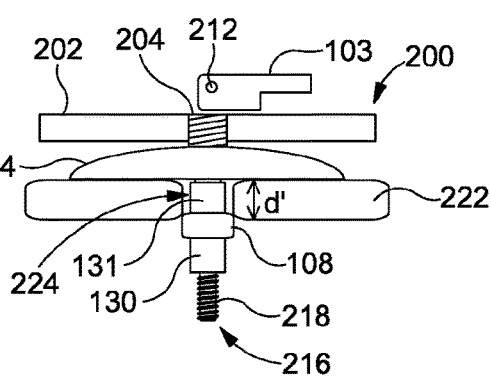
Figure 19A:
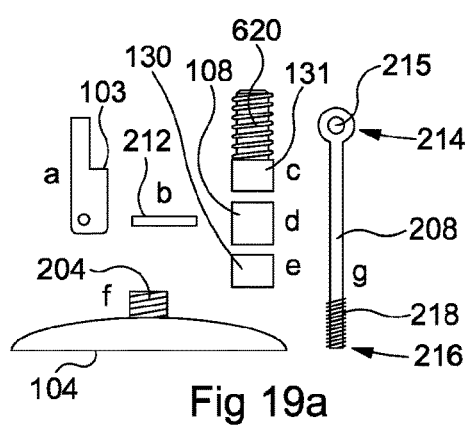
FIG. 19a shows the separate components forming the length adjustment mechanism of the suction apparatus in FIGS. 17a-18b.
Figure 19B:
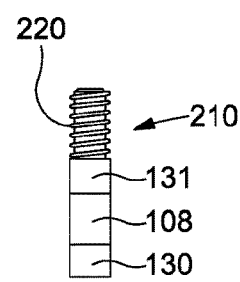
FIG. 19b shows some of the components in FIG. 19a joined together.

FIG. 18a shows the position of the neck portion 106 adjusted to its minimum length, with the body section 210, the adjustable nuts 130 and 131 and expandable portion 108 rotatably moved towards the first end 214 of the pin 208. This allows the suction apparatus to be used to engage to a toilet pan 222 having an aperture 224 with a relatively small depth 'd', as shown in FIG. 18b. FIG. 18a shows the retaining pin in a disengaged position with respect to the toilet pan 222 and FIG. 18b shows the retaining pin in an engaged position on the toilet pan 222.

It will be appreciated that the position of the expandable portion can be adjusted to ensure it has a relatively large surface area in engaging contact with a surface to which the apparatus is to be attached. For example, in some embodiments the expandable portion is at least partially or wholly located in the aperture defined in the toilet pan. In some embodiments, at least part of the expandable portion engages against a lower surface of the toilet pan. In some embodiments the expandable portion partially engages in the aperture and partially engages against a lower surface of the toilet pan.

It should be noted that the expandable section 108 must expand to a sufficient radial diameter so as to be larger than the aperture through which the pin is positioned. This is important for locking the retaining pin to the item through which it passes, and also to allow the suction cup to form a partial vacuum within its concave surface. If the expandable section 108 is not radially expanded sufficiently to close the aperture through which the retaining pin passes, the suction cup 104 cannot grip to the opposing surface. Furthermore, the axial force induced on the retaining pin whilst the expandable section expands and contacts the lower surface of the item to which it is being attached, pulls the suction cup onto the upper surface of the item, thereby inducing the partial vacuum required to obtain a sealing grip between the suction cup and that upper surface.

Referring to FIGS. 8a-14, there is illustrated a further embodiment of the present invention in which the user actuation means for the apparatus 102 is in the form of a toilet seat and lid 136, 138, thereby removing the requirement of lever 103. This arrangement is possible when the retaining pin 102 is being used to attach the toilet seat and lid to a toilet bowl 140 (e.g., a toilet pan having a biscuit 141).

Figure 8A:
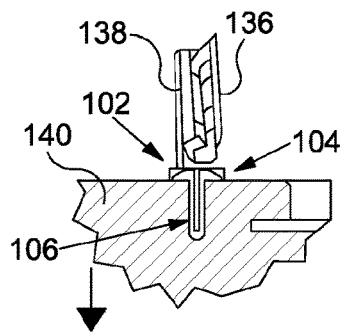
FIGS. 8a and 8b show an enlarged partial side view and a side view of suction apparatus used to fit a toilet seat/lid to a toilet in use in a first fitting position respectively.
Figure 8B:
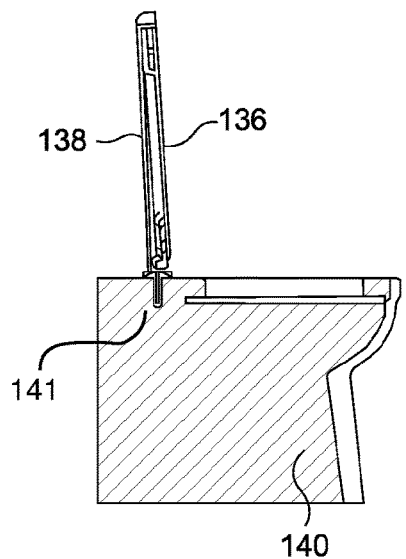

Firstly, the neck portion 106 of the retaining pin 102 is located through an aperture of a conventional toilet bowl 140 that is normally used to attach a toilet seat/lid to the bowl. The seat and lid 136, 138 are in a raised position, corresponding to the lever position shown in FIGS. 4a-4c, such that a longitudinal axis of the seat and lid are parallel or substantially parallel to a longitudinal axis of the neck portion 106, as shown in FIGS. 8a-8b.

Figure 9A:
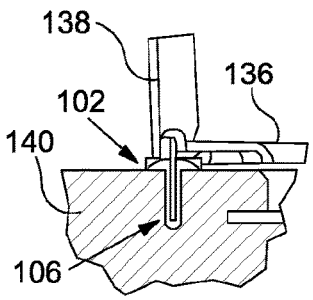
FIGS. 9a and 9b show an enlarged partial side view and a side view of the suction apparatus in FIGS. 8a-8b in a second fitting position respectively.
Figure 9B:
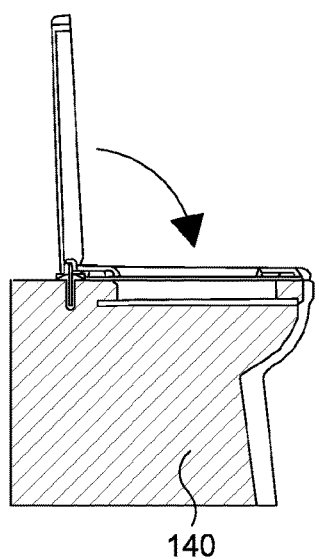

Pivotal movement of the seat 136 from the raised position to a lowered position wherein it engages with an upper surface of the toilet bowl, as shown in FIGS. 9a-9b, actuates the apparatus 102 causing the expandable portion and the suction cup to move from the disengaged position to the engaged position.

Figure 10A:
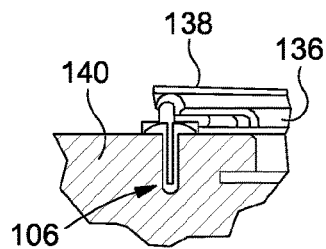
FIGS. 10a and 10b show an enlarged partial side view and a side view of the suction apparatus in FIGS. 8a-8b in a third fitted position respectively.
Figure 10B:
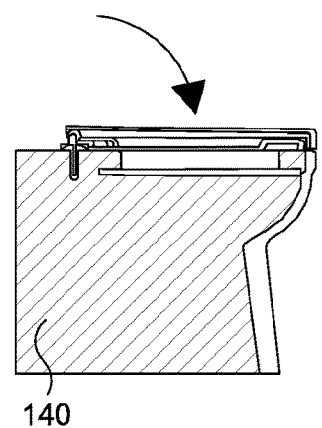

Locking means 142 provided on the apparatus 102 are then moved from an unlocked position to a locked position, which maintains the apparatus 102 in the engaged position. The toilet lid 138 can then be pivotally moved to a closed position, as shown in FIGS. 10a-10b. With the locking means 142 in a locked position, the seat and lid 136, 138 can be moved between open and closed positions as often as required without disruption of the suction apparatus engagement.

Figure 11A:
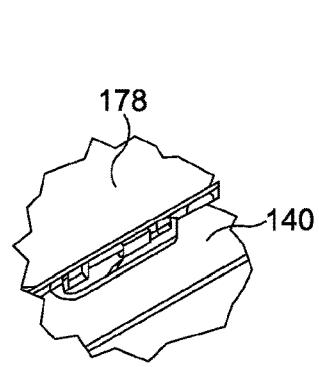
FIGS. 11a and 11b show an enlarged partial perspective view and a perspective view of the locking means provided on the apparatus shown in FIGS. 8a-10b respectively.
Figure 11B:
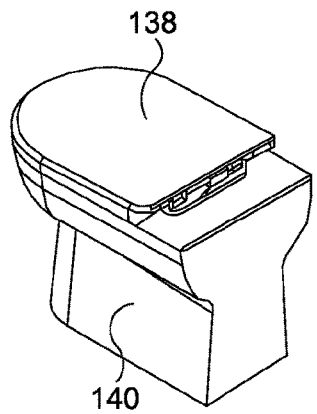

In order to remove the toilet seat and lid 136, 138 from toilet bowl 140, the locking means 142 first needs to be moved from the locked position to the unlocked position, as shown in FIGS. 11a-11b. The fitting operation then happens in reverse.

Figure 12A:
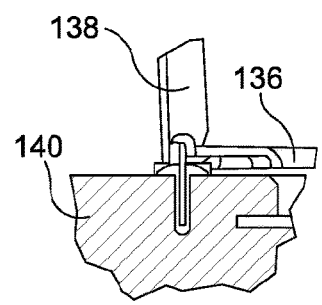
FIGS. 12a and 12b show an enlarged partial side view and a side view of the suction apparatus in FIGS. 8a-8b in a first release position respectively.
Figure 13A:
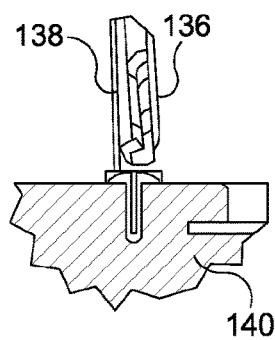
FIGS. 13a and 13b show an enlarged partial side view and a side view of the suction apparatus in FIGS. 8a-8b in a second release position respectively.
Figure 12B:
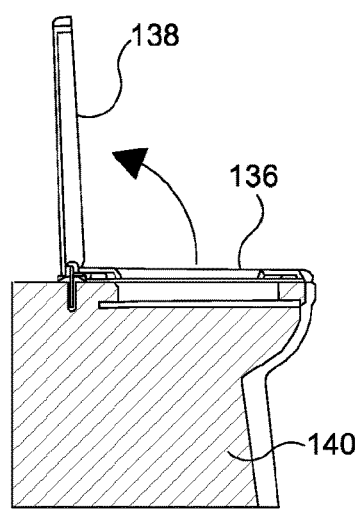
Figure 13B:
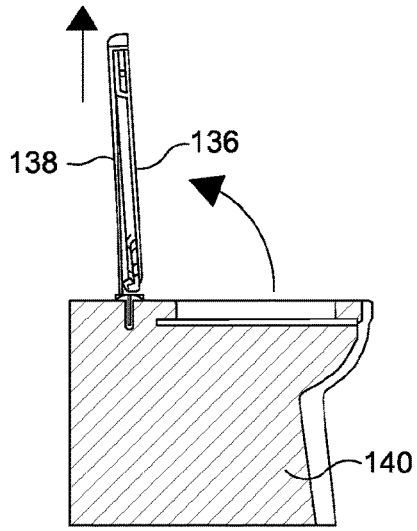
Figure 14:
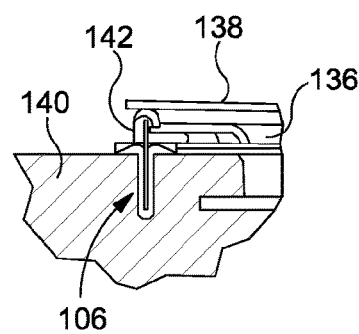
FIG. 14 shows an enlarged cross-sectional view showing the locking means in FIGS. 11a and 11b.
Figure 15A:
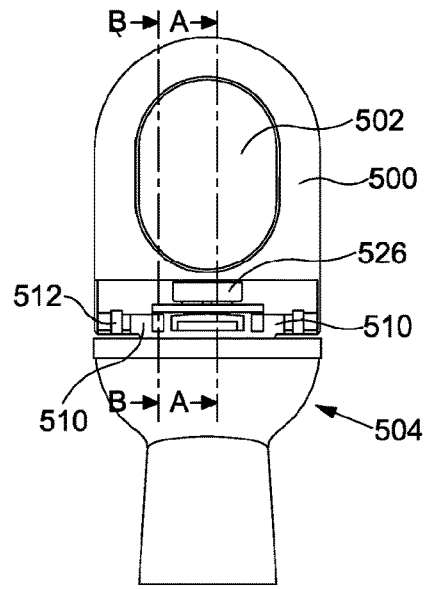
FIGS. 15a-15d show an embodiment of the suction apparatus wherein the actuation means for moving the two engagement means of the suction apparatus between the engaged and disengaged conditions is the toilet seat and lid, and a locking mechanism is provided.
Figure 15B:
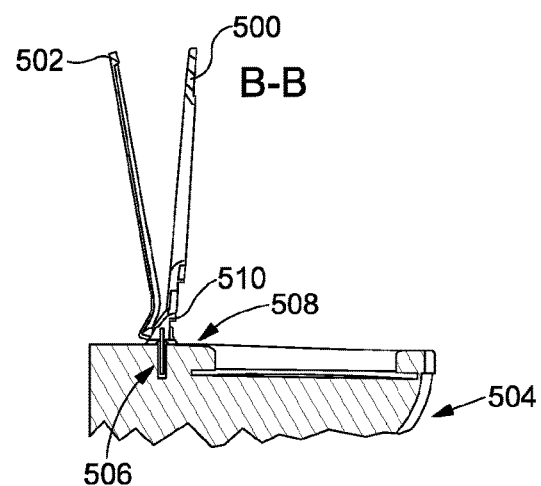
Figure 15C:
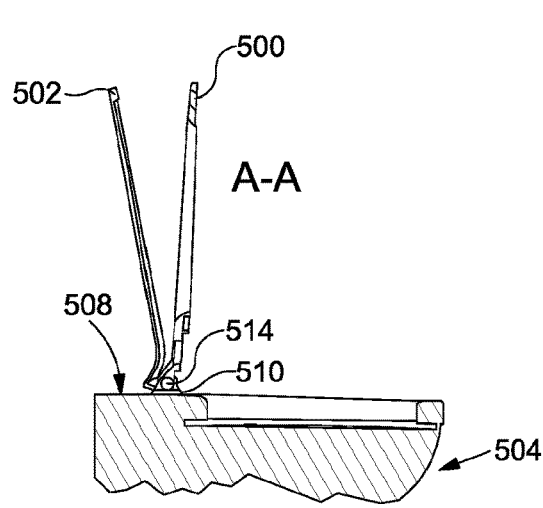
Figure 15D:
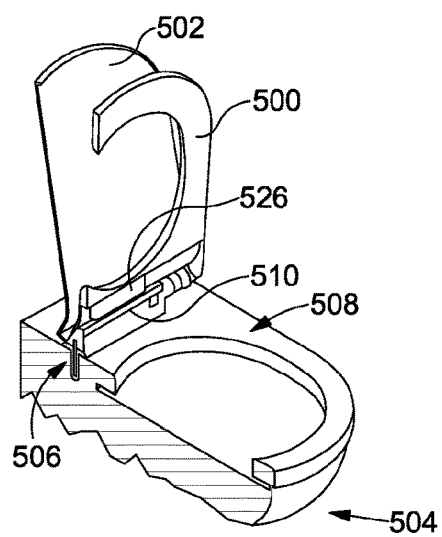

Toilet lid 138 is moved from a closed position to an open position, as shown in FIGS. 12a-12b. On movement of the toilet seat 136 from the closed position to the open position, as shown in FIGS. 13a-13b, this moves the first and second engagement means of the apparatus 102 from the engaged position to the disengaged position, thereby allowing the apparatus 102, lid and seat 136, 138 to be removed from the toilet bowl 140.

Referring to FIGS. 15a-16g, there is illustrated a further embodiment of the retaining pin of the present invention used to fit a toilet seat 500 and lid 502 to attachment apertures defined in a toilet bowl 504. In this embodiment the toilet seat 500 acts as the lever for actuating the retaining pin to move the same between the disengaged position and the engaged position as previously disclosed.

The retaining pin is provided as a single unit, including the toilet seat and lid, with two spaced apart neck portions 506.

In the start position, each neck portion 506 is inserted into the apertures defined towards the rear of the upper surface 508 of toilet bowl 504. A lower surface of head portion/suction cup sits on the support surface 508. The head portion/suction cup forms part of a body portion 510 which also sits on the upper surface 508 of the toilet bowl and extends between the two apertures. The toilet seat and lid are hingedly mounted to the body portion 510 via hinges 512.

Locking means are provided on the body portion 510 to lock the two engagement means of the retaining pin in a locked position. The locking means includes a lock body 514 which is pivotably mounted on the body portion 510 via pivot pins 516. Each pivot pin sits in elongate slots 518 provided on both sides of the pivot pins 516 to allow smooth pivoting movement of the lock body relative to the body portion 510. The pairs of slots 518 are defined in two spaced apart opposing and upwardly protruding flanges 520 defined in body portion 510.

Two lock buttons 522 are movably mounted in the lock body 514 for movement between a protruding lockable position, wherein the buttons 522 protrude outwardly of body 514 to allow engagement with a lock recess 524 defined in a lock housing 526 provided on the lower surface of toilet seat 500, that is, the surface facing the toilet bowl upper surface when in a closed position, and a recessed unlocked position, wherein the buttons 522 are relatively recessed within body 514 and do not engage in lock recess 524 of lock housing 526.

It is to be noted that the buttons 522 are resiliently biased to the locked position via resilient biasing means, such as for example via a spring.

Figure 16A:
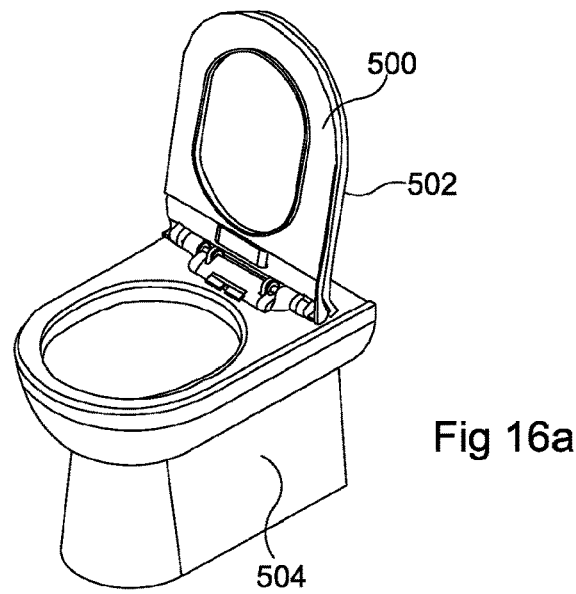
FIG. 16a shows a perspective view of the toilet bowl, toilet seat and lid with the suction apparatus in FIGS. 15a-15d with the lock buttons of the locking mechanism visible.
Figure 16B:
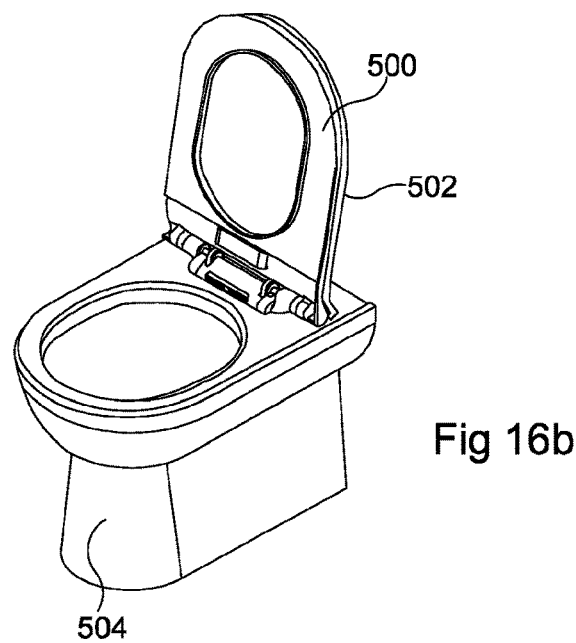
FIG. 16b shows a perspective view of the toilet arrangement in FIG. 16a with the lock buttons of the locking mechanism recessed in a second fitting position.
Figure 16C:
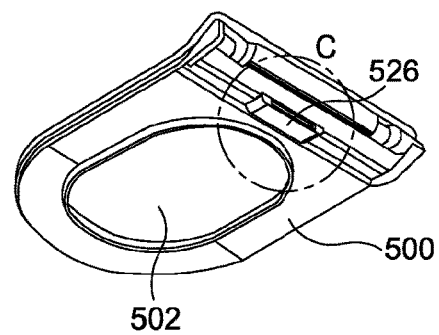
FIG. 16c is a perspective view of the underside of the toilet seat and lid showing the lock recess defined on the lower surface of the toilet seat.
Figure 16D:
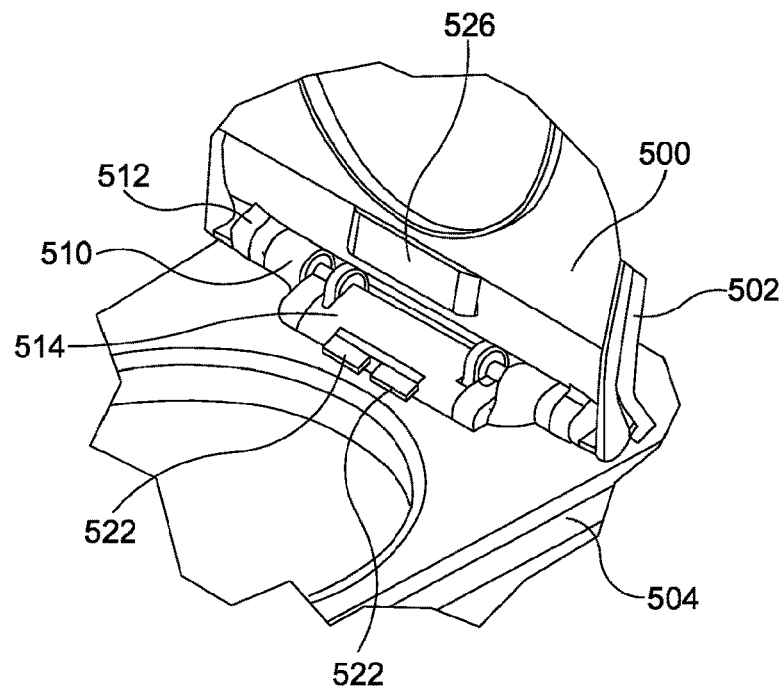
Figure 16E:
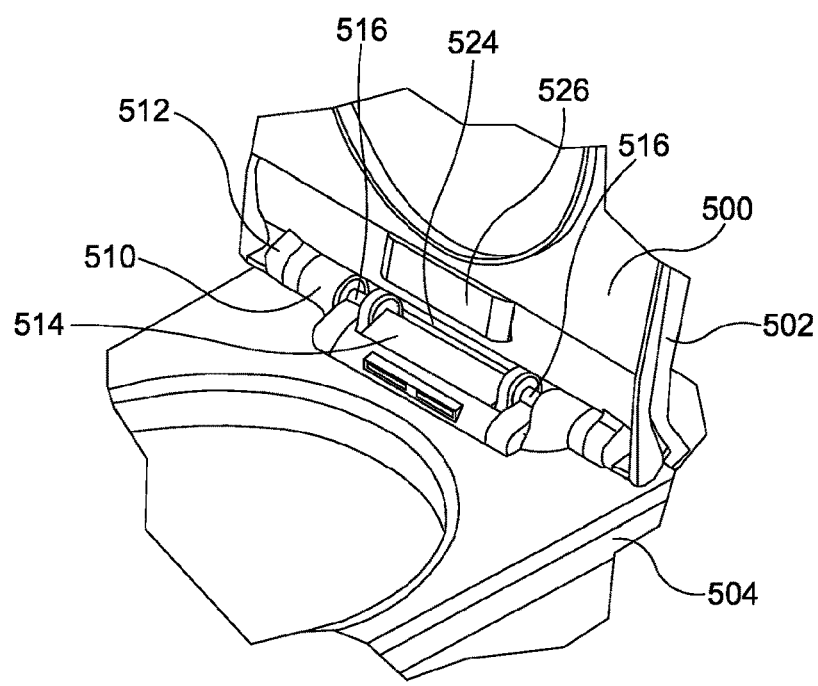
FIG. 16e is an enlarged view of the circular section in FIG. 16b.
Figure 16F:
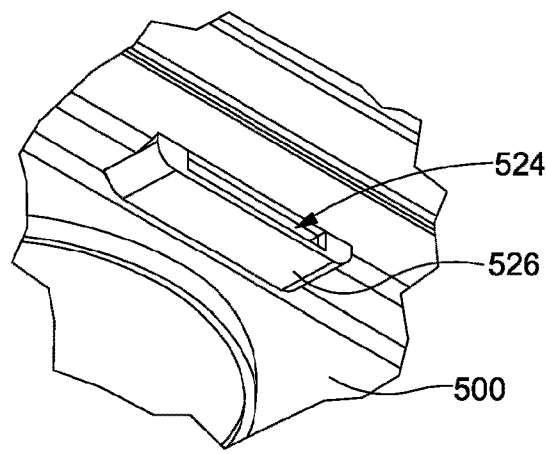
FIG. 16f is an enlarged view of the circular section in FIG. 16c.
Figure 16G:
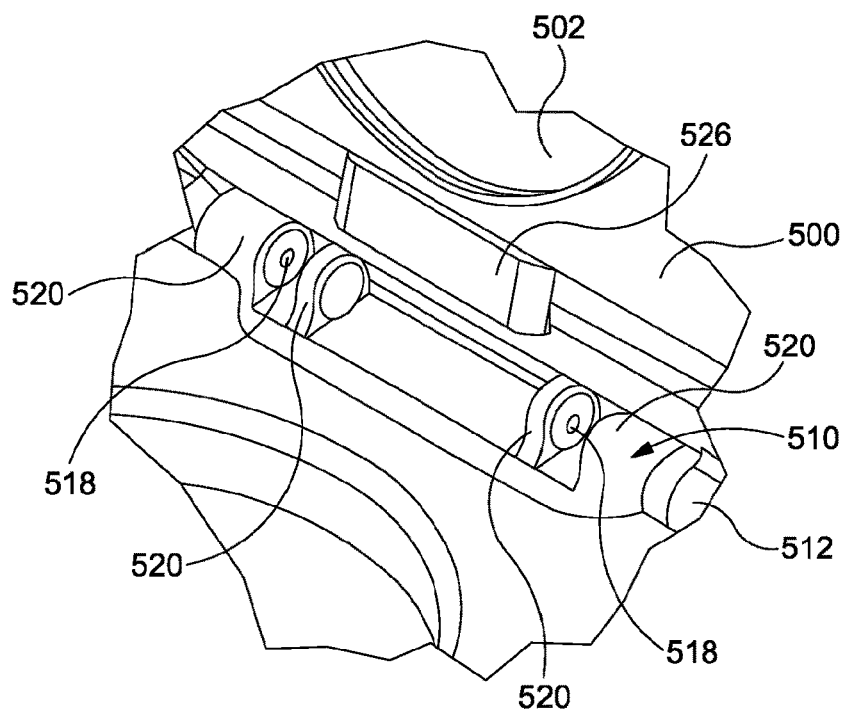
FIG. 16g is an enlarged view of the suction apparatus with the locking mechanism removed.

In the start position, as shown in FIGS. 15a-15d, the lock body 514 is parallel to the toilet seat 500 and lid 502. The buttons 522 are engaged in the lock recess 524 or lock housing 526. In order to move the neck portion from the disengaged position to the engaged position, the toilet seat 500 is lowered towards the upper surface 508 of toilet bowl 504 until it engages with the same. The toilet seat 500 acts as a lever to expand the expandable portion of the neck portion 506, thereby engaging the same in the apertures in the toilet bowl. As the toilet seat 500 is lowered, this disengages the lock buttons 522 from the lock recess and moves the lock to an unlocked position, thereby moving the lock body 514 to a position where it is now parallel to the upper surface 508 of toilet bowl 504, as shown in FIGS. 16b and e.

The toilet lid 502 is then lowered towards the upper surface 508 of the toilet bowl and the toilet seat 500. As it does so, the toilet seat lid 502 engages with an actuating portion 524 at the rear of the lock body 514, thereby moving the lock buttons 522 from the unlocked position to the locked position where they engage in lock recess 524 in housing 526. With the lock buttons in the lock recess in a locked position, this maintains the neck portion 506 and the suction cup/head portion in the engaged position, such that further movement of the toilet seat and lid between raised and lowered positions has no effect on the engaged position of the neck portion 506 and head portion/suction cup.

When a user wishes to remove the toilet seat and lid from the toilet bowl, a user manually presses on the actuating portion 524 of lock body 514, to unlock the lock means and move buttons 522 out of engagement with lock recess 524 and lifts the whole apparatus as a single unit from the toilet bowl 504.

A textured surface can be provided on the surface of buttons 522 to provide surface friction.

The invention claimed is:

1. A retaining pin comprising:
   a body section having an aperture therein and a suction cup;
   an actuator arranged at a first end of the body section;
   a pin, connected at a first end to the actuator and extending therefrom, through the aperture of the body section; and
   an outer sleeve arranged around the pin and in contact therewith;
   wherein the outer sleeve comprises an expandable section that, upon operation of the actuator, can be expanded from a first dimension to a second dimension.

2. A retaining pin according to claim 1, wherein the body section comprises a threaded section on its external surface.

3. A retaining pin according to claim 1, wherein the pin comprises an external threaded section along at least part of its length and the outer sleeve comprises a corresponding thread to engage the threaded section on the pin.

4. A retaining pin according to claim 1, wherein the outer sleeve comprises a plurality of sections.

5. A retaining pin according to claim 4, wherein sleeve comprises:
   a first section that engages the body section;
   a second section comprising an expandable material; and
   a third section that engages the pin;
   wherein actuation of the actuator moves the third section axially towards the body section to compress the second section, thereby causing it to expand radially.

6. A retaining pin according to claim 5, wherein the position of the first section on the body section is axially adjustable to vary the distance between the first section and the actuator.

7. A retaining pin according to claim 5, wherein the position of the third section is axially adjustable on the pin to vary the distance between the third section and the actuator.

8. A retaining pin according to claim 1, wherein the outer sleeve is integral with the body section.

9. A retaining pin according to claim 1, wherein the suction cup is integral with the body section.

10. A retaining pin according to claim 1, wherein the suction cup is physically connected to the body section.

11. A retaining pin according to claim 1, wherein the expandable section comprises an elastomeric material that expands radially when compressed.

12. A retaining pin according to claim 1, wherein the actuator comprises a cam to move the end of the pin distal from the actuator axially within the body section, thereby compressing the elastomeric material.

13. A toilet seat arrangement comprising a toilet seat having a body portion and a retaining pin according to claim 1 connected thereto.

14. A toilet seat arrangement according to claim 13, wherein an aperture in the body portion of the toilet seat comprises a threaded inner surface and the body section of the retaining pin comprises corresponding threaded section and the respective threaded sections engage.

15. A toilet seat and toilet pan fixing arrangement including a toilet seat according to claim 13 and a toilet pan that has a biscuit with at least one aperture therein,
   wherein the retaining pin passes through the at least one aperture in the toilet pan biscuit and, when the actuator is operated, the expandable section expands to a size larger than the aperture in the toilet pan biscuit and the suction cup contacts a surface of the toilet pan and is pressed thereagainst, thereby retaining the seat on the pan.

* * * * *